United States Patent [19]

Li

[11] Patent Number: 4,912,463

[45] Date of Patent: Mar. 27, 1990

[54] REMOTE CONTROL APPARATUS

[75] Inventor: Marshall Li, Taipei, Taiwan

[73] Assignee: Princeton Technology Corporation, Taipei, Taiwan

[21] Appl. No.: 230,144

[22] Filed: Aug. 9, 1988

[51] Int. Cl.[4] .......................... H04Q 7/02; H04Q 9/00

[52] U.S. Cl. .......................... 340/825.69; 340/825.72; 341/176

[58] Field of Search ...................... 340/825.69, 825.76, 340/825.72, 825.52, 825.44, 825.31, 825.22, 825.04, 539; 341/176, 111, 152

[56] References Cited

U.S. PATENT DOCUMENTS

| | | | |
|---|---|---|---|
| 4,315,249 | 2/1982 | Apple et al. | 340/825.52 |
| 4,316,273 | 2/1982 | Jetter | 340/825.69 |
| 4,529,980 | 7/1985 | Liotine et al. | 340/825.52 |
| 4,573,046 | 2/1986 | Pinnow | 340/825.31 |
| 4,652,860 | 3/1987 | Weishaupt et al. | 340/825.22 |
| 4,750,118 | 6/1988 | Heitschel et al. | 340/825.69 |

FOREIGN PATENT DOCUMENTS

| | | | |
|---|---|---|---|
| 011995 | 6/1984 | Japan | 341/176 |

*Primary Examiner*—Donald J. Yusko

*Assistant Examiner*—Yuk H. Lau

*Attorney, Agent, or Firm*—Spencer & Frank

[57] ABSTRACT

A remote control apparatus has a transmitter which is capable of being switched between a normal position and a changing position, and a receiver which is capable of being switched between a normal mode and a changing mode. The remote control apparatus utilizes a first memory device in the transmitter to store an address code; an address code generator in the transmitter to generate a new address code and to store it in the first memory device when the transmitter is switched to the changing position; and a transmitting device in the transmitter to transmit the address code stored in the first memory device. The remote control apparatus also utilizes a receiving device in the receiver to receive the transmitted address code; a second memory device in the receiver to store the received address code therein when the receiver is switched to the changing mode; a comparator in the receiver to compare the received address code with the address code stored in the second memory device when the receiver is switched to the normal mode; and an output gate in the receiver to be activated by the comparator to output an operating signal when the address codes are the same.

6 Claims, 3 Drawing Sheets

REMOTE CONTROL APPARATUS

BACKGROUND OF THE INVENTION

The present invention is related to a remote control apparatus which comprises a transmitter and a receiver, and more particularly to a coding system for the transmitter and receiver.

Remote control apparatus are widely used in television receivers, garage doors, security systems and other appliances and devices. Initially, a different carrier frequency was utilized for each pair of transmitters and receivers so as to isolate them from other units. In addition, various coding schemes have been utilized to encode data into digital form. A number of such transmitters and receivers include dip switches which control the coding for the transmitter and receiver. In such systems the codes can be changed by manually changing the positions of the dip switches to different positions and ensuring that the positions of the dip switches in the transmitter and receiver are the same.

The above remote control apparatus has an inherent drawback, being that the length of its address codes is limited to the pin number of the dip switch. For example, in the case of an eight-pin dip switch, only 256 possible combinations are available. In order to increase the possible combinations, the larger dip switch, such as a sixteen-pin dip switch, may be used. Such a method results in the increase in size and manufacturing cost, and also complicates its manufacturing process.

To avoid the use of dip switch, another type of remote control apparatus has been suggested, as disclosed in U.S. Pat. No. 4,529,980 issued to Liotine et al., the content of which is incorporated herein for reference. The apparatus comprises a multi-channel transmitter and receiver for controlling a plurality of functions and includes the feature of changing the codes in the receiver and transmitter in an automatic manner. When it is desired to change the address code, a program mode switch is closed in the receiver and the micro-computer recalls from the non-volatile memory the last stored code. Using this code as a start, it performs a random number generation algorithm and stores the newly generated code in the non-volatile memory and immediately transmits the new code through an infrared light emitting diode. The transmission format with the infrared light emitting diode at the receiver continues until the program mode switch is turned off. During the energization of the infrared light emitting diode in the receiver, the tranmitter is placed in closed proximity to the receiver so that it detects the code from the infrared light emitting diode and the new code is then stored in the memory of the transmitter which then produces a flashing ready signal to indicate to the operator that the programming cycle has been completed.

In this patent, the remote control apparatus comprises a radio frequency (RF) transmitter and an infrared receiver in the transmitter, and a RF receiver and an infrared transmitter in the receiver, and thus is bulky and expensive. Although the remote control apparatus eliminates the dip switches for code selection, it also removes the ability of manually changing the address code due to its automatic random number generating and changing method. In addition, since the receiver is utilized to teach the transmitter the new address code, the patent cannot be applied in the case a host transmitter is used to control several receivers with the same address code. For example, in certain home security automations, a control unit is coupled with a plurality of sensors and is used to control from a distance a plurality of devices, such as home appliances, lights, sirens and the like, when the sensors are activated. Or in the case of a commercially-available multi-event timer, it is set to control from a distance a plurality of devices at desired times, for example turning on the microwave oven at a certain hour, and turning on the video tape recorder at a different hour, and so forth. In both cases, all of the receivers in the controlled devices have to be set with the same address code. With the above patent, however, it is impossible to fulfill such a purpose.

SUMMARY OF THE INVENTION

The primary object of the present invention is to provide a remote control apparatus which avoids the difficulties encountered with the prior art described above.

More particularly, it is one of the objects of the present invention to provide a remote control apparatus wherein the transmitter can be manually controlled to generate a desired code, and the newly generated code can be transmitted to the receiver to change the code stored in the receiver, if at the same time a switch in the receiver is switched to a code changing mode.

In accordance with the present invention, a remote control apparatus includes a transmitter which is capable of being switched between a normal position and a changing position, and a receiver which is capable of being switched between a normal mode and a changing mode. The remote control apparatus comprises a first memory means in the transmitter for storing an address code; generating means in the transmitter for generating a new address code and for storing it in the first memory means when the transmitter is switched to the changing position; transmitting means in the transmitter for transmitting the address code stored in the first memory means; receiving means in the receiver for receiving the transmitted address code; a second memory means in the receiver for storing the received address code therein when the receiver is switched to the changing mode; comparing means in the receiver for comparing the received address code with the address code stored in the second memory means when the receiver is switched to the normal mode; and means in the receiver for being activated by the comparing means to output an operating signal when the address codes are the same.

BRIEF DESCRIPTION OF THE DRAWINGS

The present invention can be more fully understood by reference to the following detailed description and accompanying drawings, which form an integral part of this application.

DETAILED DESCRIPTION OF THE PREFERRED EMBODIMENTS

Figure 1:
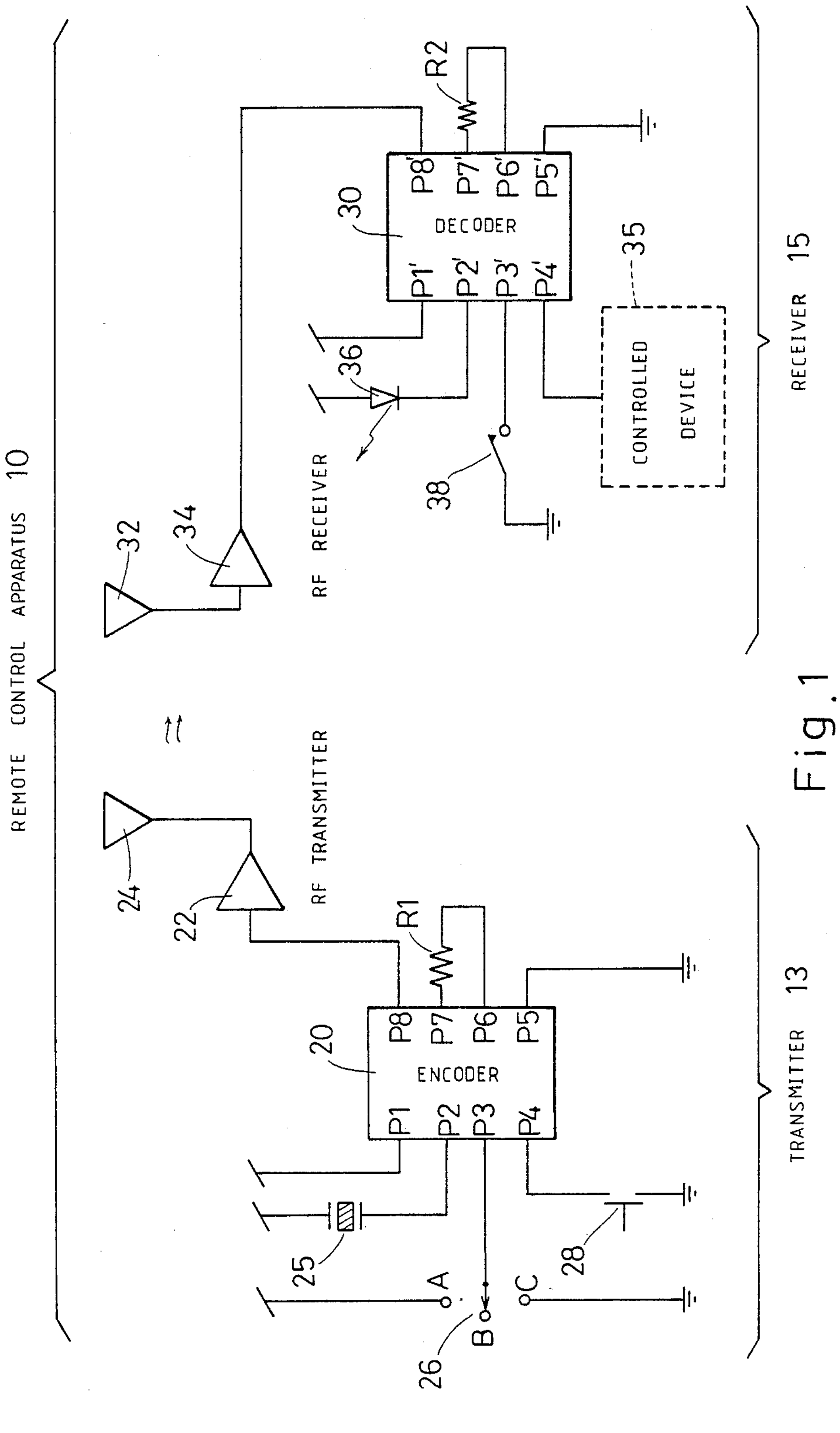
FIG. 1 is a block diagram of a remote control apparatus in accordance with the present invention.
Figure 2:
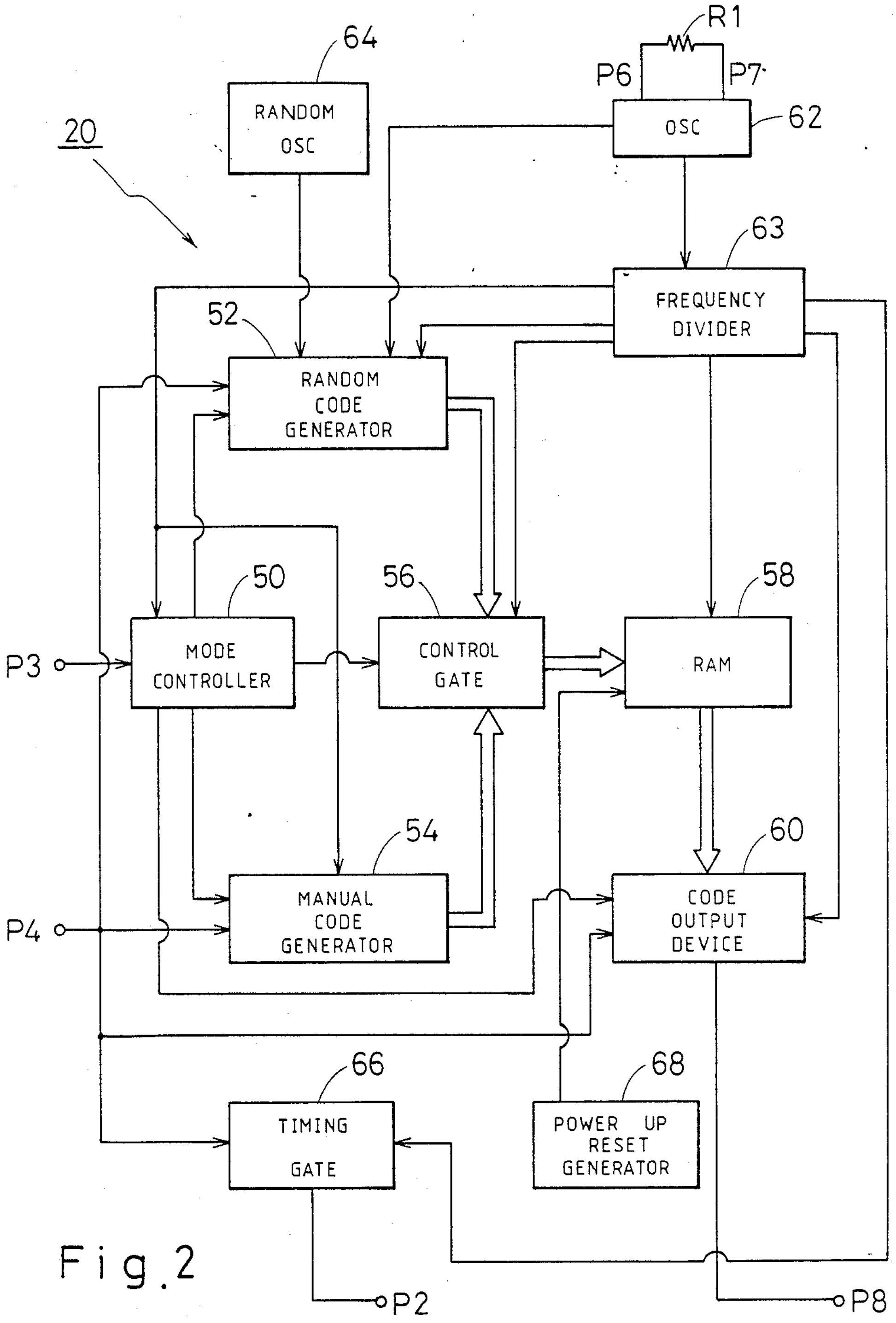
FIG. 2 is a block diagram of an encoder shown in the remote control apparatus of FIG. 1.

Referring now to FIG. 1, the remote control apparatus 10 of the present invention comprises a transmitter part 13 and a receiver part 15 controlled from a distance by the transmitter 13. The transmitter 13 includes an encoder 20, a radio frequency (RF) transmitter 22 coupled to the encoder 20, and an antenna 24 coupled to the RF transmitter 22. Preferably, the encoder 20 is integrated in an eight-pin integrated circuit (IC), and its structure is illustrated in FIG. 2 and will be described in detail below. A buzzer 25 is coupled between a voltage source and pin two (P2) of the encoder 20. A tri-state switch 26 is coupled between a voltage source, a floating point B, a pin three (P3) of the encoder 20, and earth (ground). A push-button switch 28 is coupled between pin four (P4) of the encoder 20 and earth. A resistor R1 is coupled between pin six (P6) and pin seven (P7) of the encoder 20.

Figure 3:
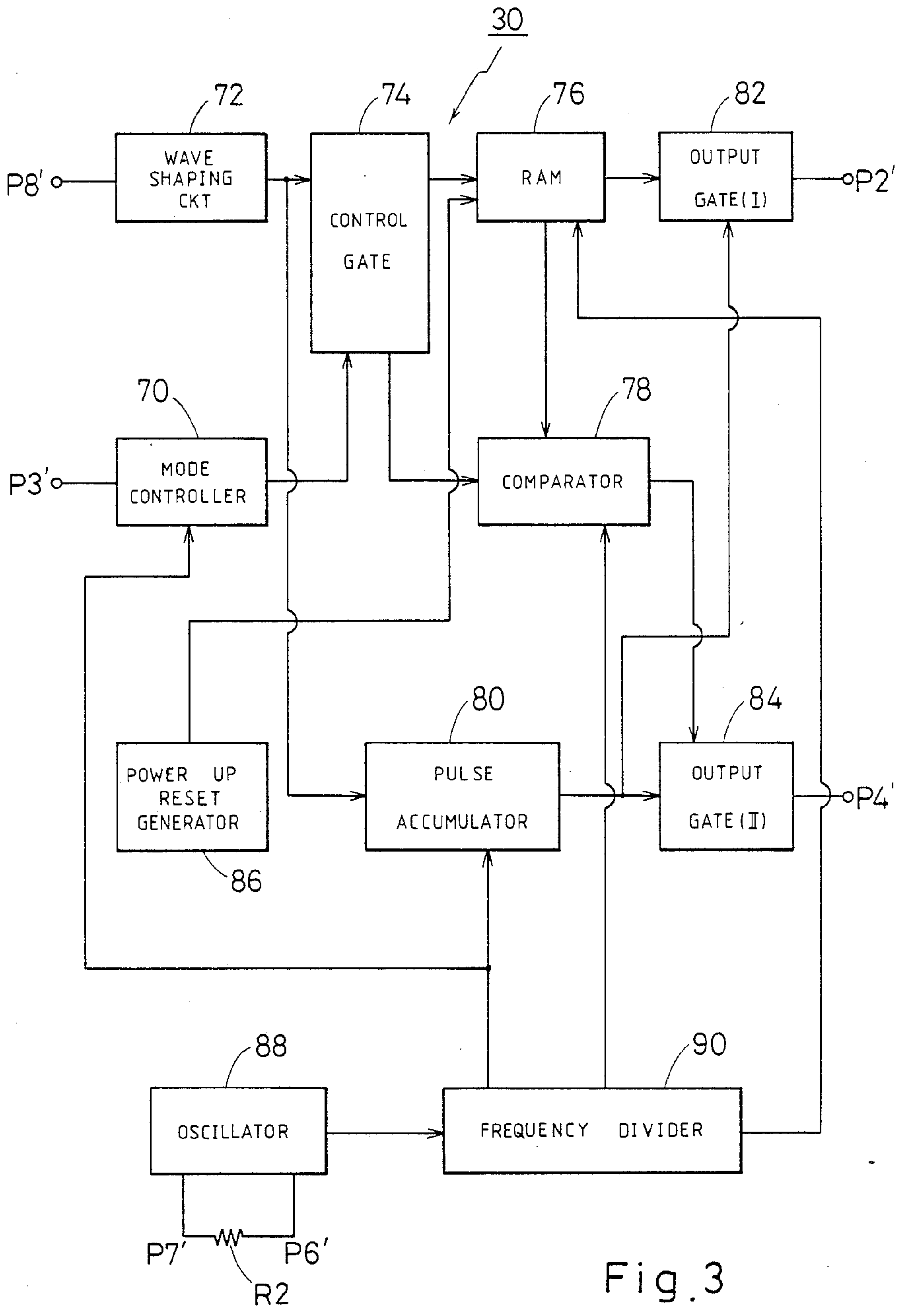
FIG. 3 is a block diagram of a decoder shown in the remote control apparatus of FIG. 1.

The receiver 15 includes an antenna 32, a RF receiver 34 coupled to the antenna 32, and a decoder 30 coupled to the RF receiver 34. Preferably, the decoder 30 is integrated in an eight-pin IC, and its structure is illustrated in FIG. 3, and described in detail below. A light emitting diode (LED) is coupled between a voltage source and pin two (P2') of the decoder 30. A switch 38 is coupled between pin three P3' of the decoder 30 and earth. A resistor R2 is coupled between pin six P6' and pin seven P7' of the decoder 30.

With reference to FIGS. 1 and 2, the encoder 20 includes a mode controller 50 connected to pin P3 in order to detect the position of the tri-state switch 26 which can be switched between a random code generating position A, a normal position B and manual setting position C, as shown in FIG. 1. A code output device 60 is coupled to pin P4, the mode controller 50 and a random access memory (RAM) 58. When the switch 26 is in the normal position B and the push-button switch 28 is depressed, the code output device 60 will be energized to retrieve the address code stored in the RAM 58 and to output it at pin P8 in series. The address code used in the present invention may include sixteen bits or any other number of desired bits. The RF transmitter 22 coupled to pin P8 receives and modulates the address code, and then radiates the modulated address code signal via the antenna 24.

In the present invention, a power up reset generator 68 is provided within the encoder 20, and coupled to the RAM 58. Since any information stored in the RAM 58 will be lost when the power is suddenly interrupted, for example when the battery in the transmitter 13 is empty, the power up reset generator 68 is utilized to reset a predetermined address code into the RAM 58 when the power has been interrupted and then resupplies. In addition to the predetermined address code, as will be described in detail below, the encoder 20 of the present invention permits the operator to store a new address code in the RAM 58 by manual setting or by way of automatic random code changing.

In the encoder 20, a timing gate 66 is connected to pin P4 in order to detect the time period during which the switch 28 is uninterruptedly depressed. A random code generator 52, a manual code generator 54 and a control gate 56 are coupled to and controlled by the mode controller 50. The control gate 56 is further coupled to the random code generator 52 and manual code generator 54 at its inputs and to the RAM 58 at its output. When the switch 26 is switched to the manual setting position C, the mode controller 50 will enable the manual code generator 54, and command the control gate 56 to connect with the manual code generator 54 and to disconnect with the random code generator 52. Since the address code is in digital form and includes a plurality of bits, the present invention permits the operator to set the address code bit-by-bit. In this preferred embodiment, the operator can depress the switch 28 to enter the address code. The manual code generator 54 will detect the depression and the depression time of the switch 28. If the switch 28 is continuously depressed in excess of a predetermined length of time, two seconds for instance, the manual code generator 54 will generate a logical high signal. If the switch 28 is depressed not over the predetermined length of time, a logical low signal will be generated. The signals generated by the manual code generator 54 are sent to the control gate 56 bit-by-bit, and then stored into the RAM 58. When the signal reaches the RAM 58, the address code stored in the RAM 58 will first shift one bit in the direction from the least-significant-bit (LSB) to the most-significant-bit (MSB). The original MSB is thus removed from the address code, and the reached signal is stored in the LSB. To assure the accuracy of the setting, the timing gate 66 will activate the buzzer 25 connected thereto via pin P2 to generate an acoustic signal if the switch 26 has been continuously depressed over the predetermined time. Consequently, if the operator wishes to enter a logical low bit, he/she can depress the switch 28 for a short time without activating the buzzer 25. If he/she wishes to enter a logical high bit, he/she can uninterruptedly depress the switch 28 until the buzzer 25 is activated. Thus, it is ensured that a logical high signal is generated. It should be understood that the buzzer 25 can be replaced by any other indicating device, for the purpose of attracting the operator's attention, such as a light emitting diode for example.

In the encoder 20, an oscillator (OSC) 62 is provided, and the resistor R1 is coupled to the oscillator 62 via pins P6 and P7. The magnitude of the resistor R1 will determine the oscillating frequency of the oscillator 62. A frequency divider 63 is coupled to one output of the oscillator 62, and is utilized to generate a variety of clock signals with different frequencies and to supply them to the respective blocks in the encoder 20. The other output of the oscillator 62 is coupled to one input of the random code generator 52. In this preferred embodiment, a random oscillator 64 is provided with its output coupled to another input of the random code generator 52. It is desired that the random oscillators in different encoders (or IC chips) always have different oscillating frequencies to ensure that the random code generating processes performed in different transmitters are not identical. During the manufacturing process of an IC, the magnitudes of the formed resistors and capacitors are uncertain and can not be accurately controlled. Consequently, the resistors and capacitors used in the random oscillators of different IC are slightly different from each other, resulting in the different oscillating frequencies.

When the switch 26 is switched to the random code generating position A, the mode controller 50 will enable the random code generator 52, and command the control gate 56 to connect with the random code generator 52 and to disconnect with the manual code generator 54. At that time, a depression of the switch 28 will activate the random code generator 52 to initiate a random code generating process. The random code generator 52 receives the oscillating signals to count two individual numbers from the oscillator 62 and the random oscillator 64. Once the switch 28 is released, the random code generator 52, in order to obtain a new address code, stops the counting and adds the two counted numbers. The new generated address code is then stored into the RAM 58 via the control gate 56.

With reference to FIGS. 1 and 3, the antenna 32 in the receiver 15 receives the signal transmitted from the transmitter 13, and the RF receiver 34 demodulates the received signal to obtain an address code signal which in turn is entered into the decoder 30 via pin P8'. Since the radiated signal from the transmitter 13 may be degraded in the air, a wave shaping circuit 72 is provided within the decoder 30 and connected to pin P8' to receive and shape the address code signal. In the decoder 30, a mode controller 70 is connected to pin P3', and a control gate 74 is provided with its two inputs coupled to the outputs of the wave shaping circuit 72 and the mode controller 70, and with its two outputs coupled to a RAM 76 and a comparator 78, respectively. When the switch 38 connected to pin P3' is in its normal open mode, the mode controller 70 will command the control gate to connect the wave shaping circuit 72 with the comparator, and not with the RAM 76. Consequently, the address code signal is sent to the comparator 78 via the control gate 74, and the comparator will retrieve the address code stored in the RAM 76 to compare it with the received address code signal. A first output gate 82 is coupled between the RAM 76 and P2', and a second output gate 84 is coupled to the comparator 78 and pin P4'. A pulse accumulator 80 is coupled to the output of the wave shaping circuit 72 to calculate the bit number of the address code signal. When the calculated bit number reaches a predetermined number, the pulse accumulator 80 will enable the first and second output gate 82 and 84. At that time, if the comparator 78 determines the received address code signal and the retrieved address code are the same, then the second output gate 84 is energized to output an operating signal at pin P4' for the device or function 35, such as a television set or garage door, which is to be controlled.

It is desired to alter the address code stored in the RAM 76, the switch 30 is closed. At this position, the mode controller 70 will command the control gate 74 to connect the wave shaping circuit 72 with the RAM 76, and not with the comparator 78. At that time, the address code signal received by the receiver 15 will be stored into the RAM 76 to act as a new address code. After the storing process is completed, the first output gate 82 will be activated to output an indicating signal at pin P2'. The light emitting diode 36 connected to pin P2' is thus turned on, to indicate the setting process is finished.

The decoder 30, similarly to the encoder, includes a power up reset generator 86 utilized to reset an address code, the same as the predetermined address code in the power up reset generator 68 of the encoder 20, into the RAM 76 when the power of the decoder 30 has been interrupted and then resupplies. An oscillator 88 is provided within the decoder 30, and coupled to the resistor R2 via pins P6' and P7'. The magnitude of the resistor R2 can determine the oscillating frequency of the oscillator 88. A frequency divider 90 is coupled to the output of the oscillator 88, and is utilized to provide the respective blocks of the decoder 30 with proper clock signals.

According to the present invention, the address code stored in the RAM 58 can be changed, individually, in the transmitter 13, both automatically or by manual setting. When the switch 26 is in the normal position and the switch 28 is depressed, the address code stored in the RAM 58 will be radiated out. In the receiver 15, if the switch 38 is in the normal mode, any received address code signal will be compared with the address code stored in the RAM 76. If the switch 38 is in the changing mode, the received address code signal will replace the original address code stored in the RAM 76 to act as a new address code.

It should be understood that the RF radiation utilized in the above preferred embodiment can also be replaced by other similar transmitting methods, such as infrared transmission, ultrasonic transmission and the like. It should be also understood that the remote control of the present invention can be achieved either wireless or wired in form. For example, the power lines in a building can be used to act as a transmission medium of the remote control apparatus of the present invention. In addition, the switches 26, 28 and 38 can be replaced by any types of switching means. For example, the switch 38 can be eliminated, and the receiver 15 can be switched to the address code changing mode by the transmitter 13 with a special password.

While the invention has been described in terms of what is presently considered to be the most practical and preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A remote control apparatus including a transmitter which is capable of being switched between a normal position and a changing position, and a receiver which is capable of being switched between a normal mode and a changing mode, said remote control apparatus comprising:

a first memory means in said transmitter for storing a digital address code having a plurality of bits;

generating means in said transmitter for generating a new address code and for storing the new address code in said first memory means when said transmitter is switched to the changing position, said generating means including a manual code generator for being manually controlled to generate the new address code;

transmitting means in said transmitter for transmitting the address code stored in said first memory means;

receiving means in said receiver for receiving the transmitted address code;

a second memory means in said receiver for storing the received address code therein when said receiver is switched to the changing mode;

comparing means in said receiver for comparing the received address code with the address code stored in said second memory means when said receiver is switched to the normal mode;

means in said receiver for being activated by said comparing means to output an operating signal when the received address code and the address code stored in said second memory means are the same; and a third switch means in said transmitter for being manually switched between on and off positions, said manual code generator being coupled to and controlled by said third switch means to generate a logical high bit signal when said third switch means is switched to the on position for greater than a predetermined length of time, and to generate a logical low bit signal when said third switch means is switched to the on position for not greater than the predetermined length of time, said first memory means comprising means for storing the logical high and low bit signals in series.

2. A remote control apparatus as claimed in claim 1, wherein said generating means further includes a timing gate coupled to said third switch means for calculating a time period during which said third switch is switched to the on position, and an indicating means coupled to said timing gate for being activated to indicate that said third switch means has been switched to the on position for greater than the predetermined length of time.

3. A remote control apparatus as claimed in claim 2, wherein said indicating means is a buzzer.

4. A remote control apparatus as claimed in claim 2, wherein said indicating means is a light emitting diode.

5. A remote control apparatus as claimed in claim 2, further comprising a first switch means in said transmitter for switching said transmitter between the normal and changing positions, and a second switch means in said receiver for switching said receiver between the normal and changing modes.

6. A remote control apparatus as claimed in claim 5, wherein said first switch means can also be switched to a random code generating position, and wherein said generating means further includes a random code generator for being activated to initiate a random address code generating process when said first switch means is switched to the random code generating position and when said third switch means is switched to the on position, said random code generator generates a random address code and stores the random address code in said first memory means when said third switch means is then released to the off position.

* * * * *